United States Patent
Zheng et al.

(10) Patent No.: US 9,722,289 B2
(45) Date of Patent: Aug. 1, 2017

(54) METAL-AIR FLOW BATTERIES USING OXYGEN ENRICHED ELECTROLYTE

(71) Applicant: Florida State University Research Foundation, Tallahassee, FL (US)

(72) Inventors: Jian-ping Zheng, Tallahassee, FL (US); Petru Andrei, Tallahassee, FL (US); Annadanesh Shellikeri, Tallahassee, FL (US); Xujie Chen, Tallahassee, FL (US)

(73) Assignee: Florida State University Research Foundation, Tallahassee, FL (US)

( * ) Notice: Subject to any disclaimer, the term of this patent is extended or adjusted under 35 U.S.C. 154(b) by 147 days.

(21) Appl. No.: 14/398,681

(22) PCT Filed: Apr. 30, 2013

(86) PCT No.: PCT/US2013/038865
§ 371 (c)(1),
(2) Date: Nov. 3, 2014

(87) PCT Pub. No.: WO2014/014548
PCT Pub. Date: Jan. 23, 2014

(65) Prior Publication Data
US 2015/0125763 A1 May 7, 2015

Related U.S. Application Data

(60) Provisional application No. 61/766,455, filed on Feb. 19, 2013, provisional application No. 61/641,676, filed on May 2, 2012.

(51) Int. Cl.
*H01M 4/90* (2006.01)
*H01M 8/04* (2016.01)
(Continued)

(52) U.S. Cl.
CPC ............ *H01M 12/08* (2013.01); *H01M 2/40* (2013.01); *H01M 4/382* (2013.01);
(Continued)

(58) Field of Classification Search
CPC ...... H01M 2/40; H01M 4/382; H01M 4/9083; H01M 8/04276; H01M 12/08; H01M 2004/8689
See application file for complete search history.

(56) References Cited

U.S. PATENT DOCUMENTS

| | | | | |
|---|---|---|---|---|
| 2011/0027664 A1* | 2/2011 | Burchardt | ........... | B60L 11/1879 429/403 |
| 2012/0077095 A1* | 3/2012 | Roumi | ............... | H01G 11/02 429/405 |
| 2013/0309581 A1* | 11/2013 | Yamaguchi | ........... | H01M 12/06 429/403 |

FOREIGN PATENT DOCUMENTS

JP        2011258489        * 12/2011   ............ H01M 12/08

* cited by examiner

*Primary Examiner* — Muhammad Siddiquee
(74) *Attorney, Agent, or Firm* — Fox Rothschild LLP

(57) ABSTRACT

A metal air flow battery includes an electrochemical reaction unit and an oxygen exchange unit. The electrochemical reaction unit includes an anode electrode, a cathode electrode, and an ionic conductive membrane between the anode and the cathode, an anode electrolyte, and a cathode electrolyte. The oxygen exchange unit contacts the cathode electrolyte with oxygen separate from the electrochemical reaction unit. At least one pump is provided for pumping cathode electrolyte between the electrochemical reaction unit and the oxygen exchange unit. A method for producing an electrical current is also disclosed.

16 Claims, 11 Drawing Sheets

(51) Int. Cl.
   *H01M 12/08* (2006.01)
   *H01M 2/40* (2006.01)
   *H01M 4/38* (2006.01)
   *H01M 8/04276* (2016.01)
   *H01M 4/86* (2006.01)

(52) U.S. Cl.
   CPC ..... *H01M 4/9083* (2013.01); *H01M 8/04276* (2013.01); *H01M 2004/8689* (2013.01); *Y02E 60/128* (2013.01)

METAL-AIR FLOW BATTERIES USING OXYGEN ENRICHED ELECTROLYTE

CROSS REFERENCE TO RELATED APPLICATIONS

This Application is a §371 national stage entry of International Application No. PCT/US2013/038865, filed on Apr. 30, 2013 which claims priority to U.S. Provisional Patent Application No. 61/641,676, filed May 2, 2012 and U.S. Provisional Patent Application 61/766,455, filed Feb. 19, 2013, the entireties of which are incorporated herein by reference.

STATEMENT REGARDING FEDERALLY SPONSORED RESEARCH

This invention was made with government support under contract No. CERDEC/GTS-S-11-396 awarded by the U.S. Army and US Department of Energy ARPA-E program to response proposal solicitation #: DE-FOA-0000670. The Government has certain rights in this invention.

FIELD OF THE INVENTION

The present invention relates to lithium ion batteries, and more particularly to metal air flow lithium ion batteries.

BACKGROUND OF THE INVENTION

Grid-connected renewable energy systems have experienced a rapid growth in the U.S. recently. Both wind and photovoltaic energy production have almost doubled in the last several years requiring new energy storage systems. As an example, the annual growth rates in the U.S. were 25% and 74% for wind and photovoltaic energy, respectively, in 2011 over 2010. Due to the variable and stochastic nature of renewable sources this energy is difficult to manage, especially at high levels of penetration. The current lead-acid and flow batteries that are being used in grid-connected renewable systems are not cost effective and reliable enough to be integrated in large grids. New storage solutions would ultimately need to be scaled to tens of gigawatts of power with tens of gigawatt-hours of energy distributed across the grid, to address the minutes-to-hours power firming and smoothing needed for renewable energy generation nationwide.

Recently, Li-air batteries have been attracted much attention because of the possibility of extremely high energy density. The theoretical energy density of the batteries can be over 3,000 Wh/kg which is more than 10 times greater than that of Li-ion batteries. Although traditional Li-air batteries have an extremely large theoretical energy density, they suffer from several drawbacks: (1) the $Li_2O_2/Li_2O$ discharge product deposits on the air side of the electrode reducing the pore size and limiting the access of $O_2$ into the cathode. The discharge products deposit mostly near the air side of the electrode because the $O_2$ concentration is higher on this side. This inhomogenous deposition of reaction products severely limits the usage of cathode volume, which limits the maximum capacity and energy density of the battery; (2) the cyclability and energy efficiency of Li-air batteries are poor due to the lack of effective catalysts to convert solid $Li_2O_2/Li_2O$ discharge products into Li ions; and (3) the current and power densities of Li-air batteries are much lower compared to conventional batteries due to the extremely low oxygen diffusion coefficient in liquid solution.

There are some efforts to improve the cyclability of Li-air batteries with most research focusing on the development of catalysts which can effectively accelerate the oxygen reduction process and reduce recharge overvoltage. The poor reversibility of Li-air batteries is due to the formation of solid oxide discharge products which are difficult to reduce and decompose into Li-ions and oxygen within the electrolyte's stable potential. Improved catalysts could reduce the reduction potential but could not effectively reduce all solid oxide products deposited in a highly porous electrode. The most significant challenge to rechargeability of Li-air batteries is the formation of solid discharge products.

SUMMARY OF THE INVENTION

A metal air flow battery comprises an electrochemical reaction unit. The electrochemical reaction unit comprises an anode electrode, a cathode electrode, an ionic conductive membrane between the anode and the cathode; an anode electrolyte; and a cathode electrolyte. An oxygen exchange unit is provided for contacting the cathode electrolyte with oxygen separate from the electrochemical reaction unit. At least one pump can be provided for pumping cathode electrolyte between the electrochemical reaction unit and the oxygen exchange unit. The metal air flow battery can further comprise an electrolyte storage unit for receiving cathode electrolyte from the electrochemical reaction unit and returning cathode electrolyte to the electrochemical reaction unit.

The cathode electrode comprises a porous carbon. The porous carbon can be at least one selected from the group consisting of carbon black, activated carbon, carbon nanotubes, carbon nanofibers, carbon fibers, and mixtures thereof.

The anode can be lithium metal. The anode can comprise at least one selected from the group consisting of silicon, germanium, titanium, graphite carbon, and hard carbon.

The cathode electrolyte can be aqueous. The cathode electrolyte can comprise at least one selected from the group consisting of LiOH, $CH_3COOLi$, $LiClO_3$, $LiClO_4$, HCOOLi, $LiNO_3$, $C_6H_4(OH)COOLi$, $Li_2SO_4$, LiBr, LiCl, LiSCN, and mixtures thereof.

The anode electrolyte can comprise a solvent selected from the group consisting of ethylene carbonate, propylene carbonate, dimethyl carbonate, diethyl carbonate, tetrahydrofuran, dimethoxyethane, and mixtures thereof. The anode electrolyte can comprises a salt selected from the group consisting of lithium perchlorate, lithium hexafluoroarsenate, lithium tetrafluoroborate, and mixtures thereof.

An ionic conductive membrane has good conductivity for Li ions and good chemical stability in both non-aqueous and aqueous solutions. The ionic conductive membrane is also able to isolate the two electrolytes. The ionic conductive membrane can be a Celgard 2400 membrane.

The oxygen exchange unit can comprises an electrolyte storage unit. The oxygen exchange unit can comprise a discharge manifold for discharging oxygen into cathode electrolyte. The oxygen exchange unit can comprises a plurality of stacked trays having apertures for the upward flow of oxygen and the downward flow of cathode electrolyte. The oxygen exchange unit can comprise an elongated conduit, the conduit comprising portions that are permeable to oxygen and impermeable to the cathode electrolyte.

The electrolyte entering the electrochemical reaction unit is caused to flow into one part of the porous cathode, flow through the porous cathode, and flow out of another side of the porous cathode.

A method for producing an electric current comprises the step of providing an electrochemical reaction unit comprising an anode electrode, a cathode electrode, an ionic conductive membrane between the anode and the cathode, an anode electrolyte, and a cathode electrolyte. An oxygen exchange unit contacts the cathode electrolyte with oxygen separate from the electrochemical reaction unit. Cathode electrolyte is pumped between the electrochemical reaction unit and the oxygen exchange unit and contacting the electrolyte with oxygen while the battery is being discharged. The cathode electrolyte can be caused to flow into one part of the porous cathode electrode, flow through at least part of the cathode electrode to deliver $O_2$ to the cathode, and flow out of another part of the cathode electrode prior to returning to the oxygen exchange unit.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
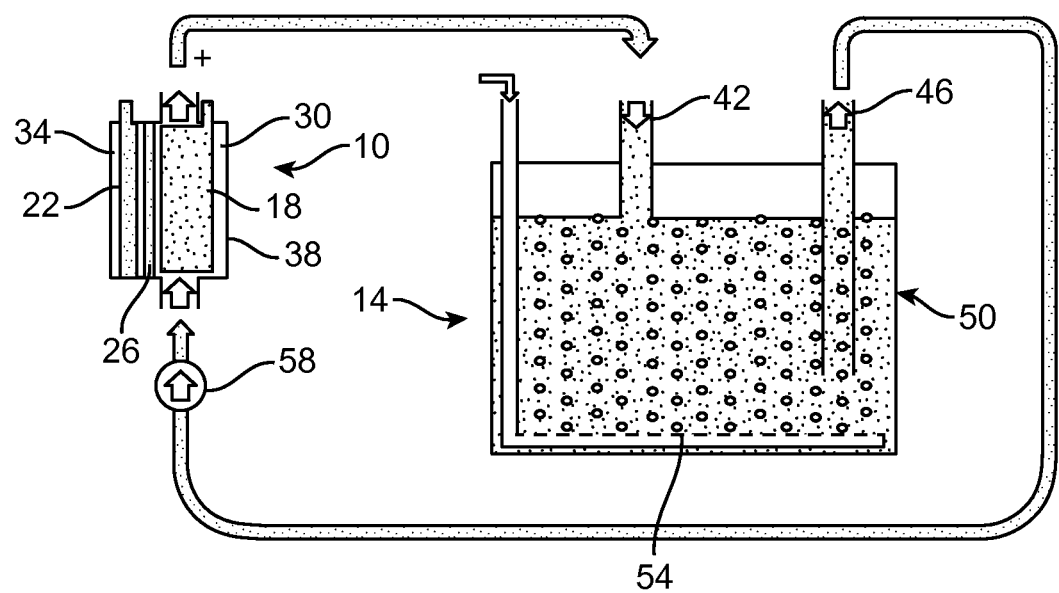
FIG. 1 is a schematic diagram showing the operational principle and configuration of a metal-air flow battery according to the invention.

A metal air flow battery includes at least an electrochemical reaction unit and an oxygen exchange unit. The electrochemical reaction unit includes an anode electrode, a cathode electrode, an ionic conductive membrane between the anode and the cathode, an anode electrolyte, and a cathode electrolyte. The oxygen exchange unit contacts the cathode electrolyte with oxygen separate from the electrochemical reaction unit. The term "separate" as used herein means that the point of contact between $O_2$ diffusing into the cathode electrolyte is removed from the cathode electrode. The cathode electrolyte leaves the electrochemical reaction unit to reach the oxygen exchange unit or the oxygen exchange/electrolyte storage combined unit (FIGS. 1 and 2), where it is enriched with $O_2$. Cathode electrolyte flows from the electrochemical reaction unit to the oxygen exchange unit, and is enriched with $O_2$. The cathode electrolyte is then returned from the oxygen exchange unit to the electrochemical reaction unit after the cathode electrolyte. The cathode electrolyte enriched with $O_2$ flows through the porous cathode electrode and supplies the $O_2$ to the electrochemical reaction. At least one pump is provided for pumping cathode electrolyte between the electrochemical reaction unit and the oxygen exchange unit.

The battery consists of at least two units (FIG. 1), the electrochemical reaction unit 10, and the oxygen exchange unit 14. An electrolyte storage unit is also possible. The electrochemical reaction unit 10 has cathode electrode 18, anode electrode 22, membrane 26, cathode electrolyte 30, and anode electrolyte 34 which can be provided in a suitable battery case 38. The oxygen exchange/electrolyte storage unit 14 can have cathode electrolyte inlet 42, and cathode electrolyte outlet 46 in a container 50. An oxygen exchange device 54 releases oxygen into the cathode electrolyte within the container 50. A pump 58 moves the electrolyte between the electrochemical reaction unit 10 and the oxygen exchange unit 14. The electrochemical reaction unit during discharge converts chemical energy into electrical energy, and during charging converts electrical energy to chemical energy. The maximum output power of the system is given by the maximum current density and the electrode size of the electrochemical reaction unit; and the oxygen exchange unit regenerates (i.e. refreshes) the electrolyte to become electrochemically reactive. The electrolyte regeneration rate should preferably balance the oxygen consumption rate in the electrochemical reaction unit. The term "balance" as used herein means that the molar rate of $O_2$ diffusing into the cathode electrolyte equals the molar rate of consumption of $O_2$ in the electrochemical reaction unit or is within 1%, 5%, 10%, 15%, 20%, or 25% of that rate.

The electrochemical reaction unit can be similar to conventional Li-air batteries with dual electrolytes and can contain a Li metal (or other Li rich materials or Li intercalatable materials) as the anode material due to its high specific capacity and low potential. A porous carbon or other suitable porous material or structure can be provided as the air electrode. Many such materials and structures are known. A suitable solid/polymer ionic conductive membrane is provided. An appropriate anode electrolyte and an appropriate cathode electrolyte are provided. The cathode electrode does not open directly to the atmosphere to receive the oxygen, but instead electrolyte is circulated continuously between the electrochemical reaction unit and the oxygen exchange unit (FIG. 1). For example, during discharge, the fresh electrolyte which is saturated with oxygen is pumped into the electrochemical reaction unit, while the used electrolyte will be removed from the electrochemical reaction unit and sent to the oxygen exchange unit to be refreshed. The oxygen exchange unit is designed to ensure the electrolyte will achieve a satisfactory oxygen saturation level before entering into the electrochemical unit.

Figure 2:
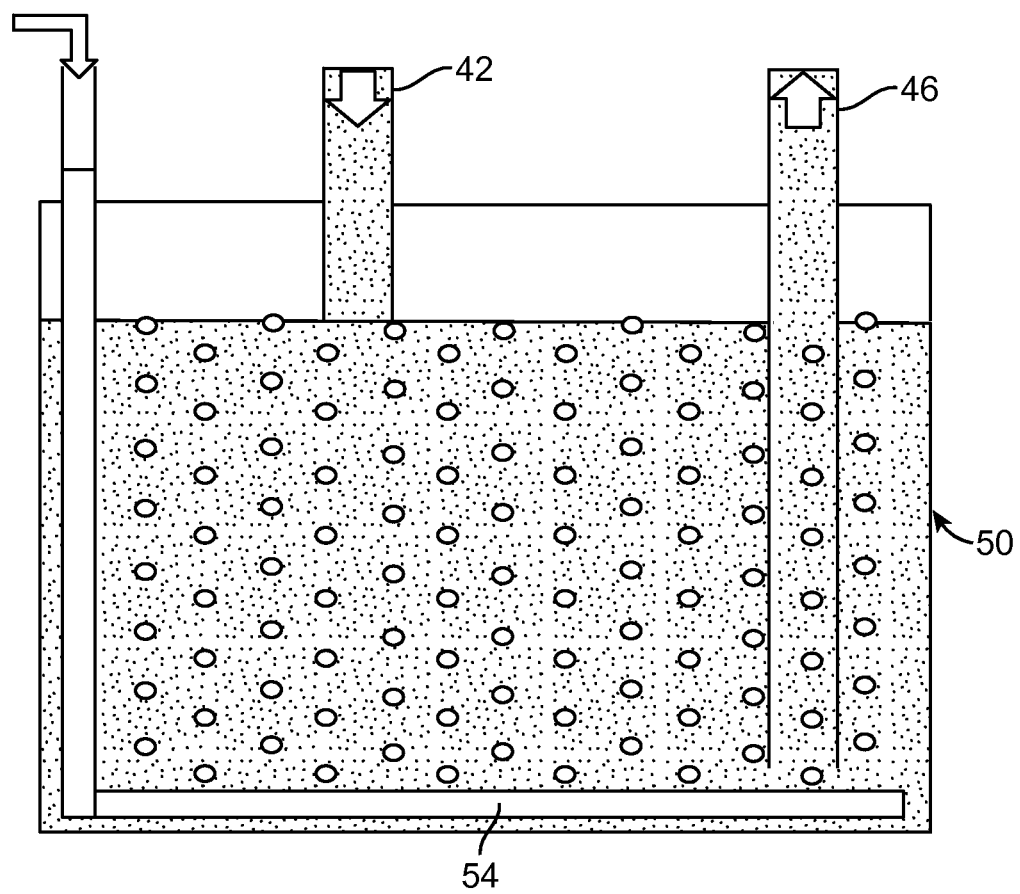
FIG. 2 is a schematic diagram of an oxygen exchange unit.

The oxygen exchange unit can also be configured to store electrolyte. FIG. 2 shows one of possible designs. The aqueous electrolyte in the oxygen exchange unit 14 is bubbled with air from oxygen exchange device 54 which can be any suitable oxygen exchange device in order to increase the interfacial area between oxygen and electrolyte and make the oxygen concentration in the electrolyte as high as possible. The housing or container 50 of the oxygen exchange unit is sized to provide adequate electrolyte storage to meet system requirements. The maximum energy storage capability of the system is ultimately determined by the amount of electrolyte in the electrolyte storage unit (or the size of the storage container) and the solubility of the solvent(s) used for the electrolyte.

Figure 3:
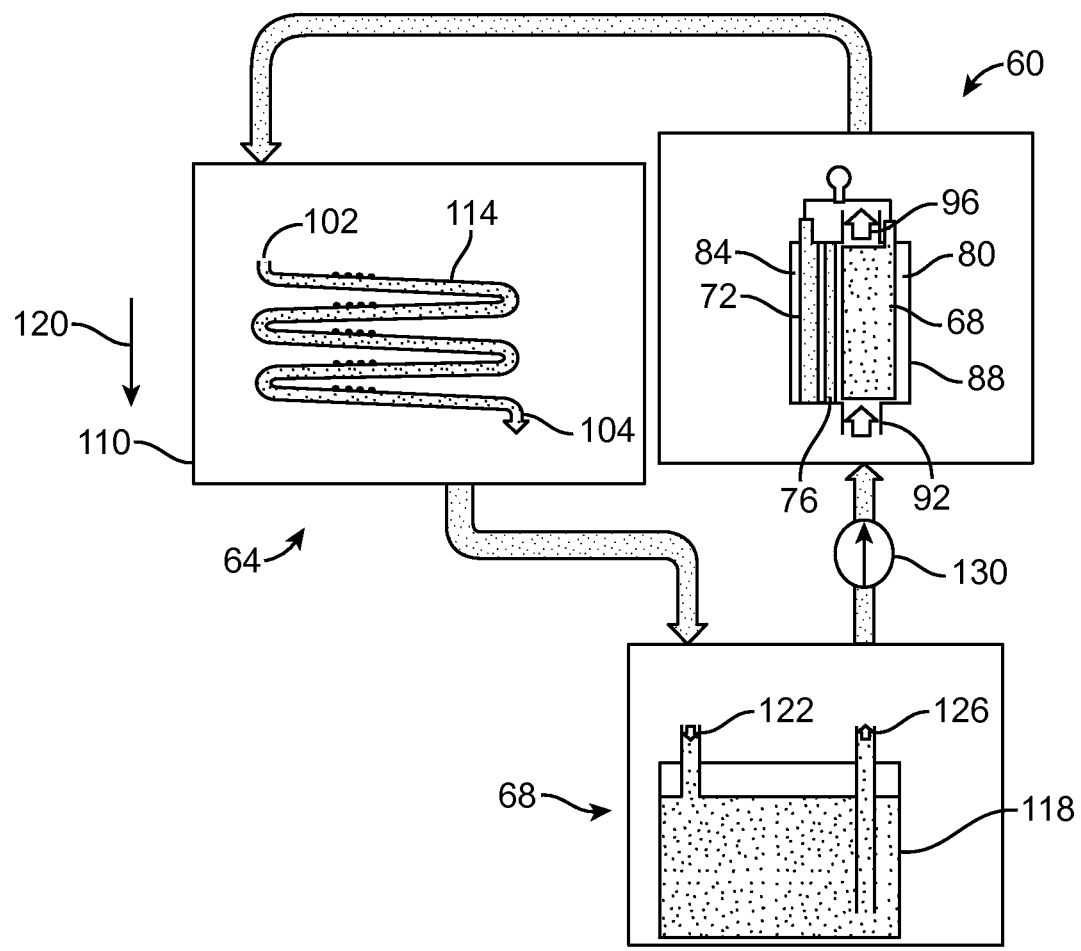
FIG. 3 is a schematic diagram of an alternative embodiment with an electrochemical reaction unit, an oxygen exchange unit, and an electrolyte storage unit.

The electrolyte storage unit and oxygen exchange unit in FIG. 1 can be separated in order to make the system more energy efficient and easier to scale up. FIG. 3 shows a three-unit Li-air flow battery including the electrochemical reaction unit 60, the oxygen exchange unit 64, and an electrolyte storage unit 68. The electrochemical reaction unit 60 has cathode electrode 68, anode electrode 72, membrane 76, cathode electrolyte 80, and anode electrolyte 84 which can be provided in a suitable battery case 88. Cathode electrolyte enters through an inlet 92 and leaves through an outlet 96. The oxygen exchange/electrolyte storage unit 64 can have cathode electrolyte inlet 102 and cathode electrolyte outlet 104 in a container 110. An oxygen exchange device 114 releases oxygen into the cathode electrolyte within the container 110. The oxygen exchange device 114 can be in the form of a flow canal which injects or otherwise permits the passage of oxygen into the cathode electrolyte. Flow through the oxygen exchange device 114 can be assisted by gravity 120. The electrolyte storage unit 68 has a container 118 for storing the cathode electrolyte, an inlet 122 and an outlet 126. A pump 130 can move the electrolyte between the electrochemical reaction unit 60 and the oxygen exchange unit 64, and the electrolyte storage unit 68.

It is important that during discharge, the fresh electrolyte which is saturated with oxygen is pumped into the electrochemical reaction unit, while the used electrolyte will be sent to the oxygen exchange unit to be refreshed. The integrated exchange and storage system is designed to ensure the electrolyte will achieve a satisfactory oxygen saturation level before entering into the electrochemical reaction unit. The electrolyte storage unit determines the maximum energy storage and delivery capacity. The electrolyte storage unit can be made with several subunits. Subunits can be connected in series or parallel. The series connection means that one inlet is connected to another outlet; the parallel connection means that inlets are connected together and outlets are connected together. The system can be pressurized.

The electrolyte storage unit is a container with at least one inlet and one outlet for circulation of the electrolyte as shown in FIG. 3. The electrolyte stored in the container is same as that in the cathode electrode of the electrochemical reaction unit. The electrolyte in the electrochemical reaction unit will be cycled with the electrolyte storage unit during the charge and discharge.

During the discharge process, the oxygen rich electrolyte in the oxygen exchange unit will increase the oxygen concentration in the cathode electrolyte of the electrochemical reaction unit to provide enough oxygen for the electrochemical reaction as:

$$4Li + O_2 + 2H_2O \leftrightarrow 4Li^+ + 4OH^- \quad (1)$$

During the discharge process, the diluted electrolyte (Li concentration) in the electrolyte storage unit will reduce the Li ion concentration for preventing the discharge product to reach the solubility limitation and solid deposition in the cathode electrode of the electrochemical reaction unit for preventing the discharge product to reach the solubility limitation and solid deposition in the air electrode; during the charge (or re-charge) process, the electrolyte storage unit will provide Li ions to the cathode electrode in the electrochemical reaction unit.

During the discharge process, the minimum flow rate of the cathode electrolyte through the cathode electrode in the electrochemical reaction unit can be determined by the relationship of the current produced by the electrochemical reaction unit, the Li-ion concentration and oxygen concentration in the electrolyte storage unit as:

$$\text{Flow } rate1 \vert_{discharge} = \frac{1}{F(m_{sol} - m)} \quad (2)$$

$$\text{Flow } rate2 \vert_{discharge} = \frac{1}{2Fm_{O2}} \quad (3)$$

where l is the current, F is the Faraday constant and equals 96,485 C/mol, $m_{sol}$ is the maximum Li-ion molar concentration (solubility) of the electrolyte, m is the Li-ion molar concentration of the electrolyte leaving the oxygen exchange unit and/or the electrolyte storage unit, and $m_{O2}$ is the oxygen molar concentration in the oxygen exchange unit and/or the electrolyte storage unit. The minimum cathode electrolyte flow rate will be determined by the greater value between Flow rate 1 and Flow rate 2 in eqns. (2) and (3). The oxygen and water concentrations limit the reaction more than lithium-lithium concentration is not often a limiting factor. If there is not enough water the Li concentration will reach the solubility limit and start to deposit as a solid product. If m is close to $m_{sol}$ then a much faster water/electrolyte flow will be necessary.

The minimum flow rate (usually liters/min) during the charging process can be determined as:

$$\text{Flow rate} \vert_{charge} = \frac{1}{Fm} \quad (4)$$

where F is the Faraday constant and m is the Li-ion molar concentration. A fast charge depends on the Li concentration.

The oxygen exchange unit is designed to allow the electrolyte from the electrochemical reaction unit to be fully exposed to the air; therefore, the oxygen concentration in the electrolyte can be close to a saturation level, particularly during the discharge process. The electrolyte flow canal as shown in FIG. 1 should be designed with a total length long enough that the electrolyte residence/flow time is longer than the required time for the oxygen diffusion. The oxygen diffusion time can be estimated by:

$$t_{O2} = \frac{l^2}{D_{O2}} \quad (5)$$

where l is the electrolyte depth in the electrode flow canal and the $D_{O2}$ is the oxygen diffusion coefficient in the electrolyte.

The cathode electrode can be made with any suitable porous conductive cathode material, such as an electrically conductive porous carbon. The porosity of the electrode will be optimized according to the electrical conductivity and the electrolyte flow resistance. The carbon used in cathode can be carbon black, activated carbon, carbon nanotubes, carbon nanofibers, carbon fibers, and their mixture.

The cathode can be constructed so as to allow the cathode electrolyte to flow into the porous cathode and carry Li ions and $O_2$ to and from the cathode, and flow out of the porous cathode to return the cathode electrolyte to the oxygen exchange unit. High pressure drops should be avoided. The porous electrode should also be capable of retaining a suitable catalyst.

The electrolyte used in cathode electrode is preferably an aqueous electrolyte. Water ($H_2O$) can be the solvent. Suitable electrolyte salts for the cathode include LiOH, $CH_3COOLi$, $LiClO_3$, $LiClO_4$, HCOOLi, $LiNO_3$, $C_6H_4(OH)COOLi$, $Li_2SO_4$, LiBr, LiCl, and LiSCN. Other possible solvents include methanol, acetonitrile, ethyl ether, acetone, ethanol, propanol, and isopropyl ether.

The anode electrode in the electrochemical reaction unit is made with Li metal, Li/other metal alloys, or Li/other metal mixtures. The other metals can be silicon, germanium, titanium, graphite carbon, and hard carbon. The solid anode material is surrounded by non-aqueous electrolyte. The solid anode material can also be wrapped by a porous paper.

The anode electrode can also be made without Li present, but with intercalatable materials such silicon, germanium, titanium, graphite carbon, and hard carbon. In an anode electrode without Li present, the Li source (during charging) can come from the aqueous electrolyte in cathode electrode. The Li ion will intercalate into the intercalation components during the charging of the battery.

The anode electrolyte can be an organic electrolyte. The electrolyte used in the anode electrode can be similar to that used for conventional Li-ion batteries. The electrolyte will be optimized as an electrolyte by forming it from an appropriate salt and an appropriate solvent mixture. The selection options include high dielectric constant carbonate solvents such as ethylene carbonate (EC) and propylene carbonate (PC), which are able to dissolve sufficient amounts of lithium salt, low viscosity carbonate solvents such as dimethyl carbonate (DMC) and diethyl carbonate (DEC) for high ionic conductivity, and ether solvents such as tetrahydrofuran (THF) dimethoxyethane (DME) for improved lithium morphology in order to suppress dendritic lithium growth during the cycles. The selection of an appropriate salt for the anode electrolyte can be based on some conventional salts such as lithium perchlorate ($LiClO_4$), lithium hexafluoroarsenate ($LiAsF_6$), and lithium tetrafluoroborate ($LiBF_4$), but not limit to these. Other anode electrolytes are possible.

The membrane between the anode and cathode electrodes must have a good conductivity for Li ions and good chemical stability in both non-aqueous and aqueous solutions, as well as be able to isolate the two electrolytes. One such membrane is a Li-ion glass-ceramic (LIC-GC) membrane. Other membranes are possible, such as Li-ion conductive polymers.

A separator such as the Celgard 2400 (Celgard LLC, Charlotte N.C.) can be used. The separator is placed between the anode and the membrane. Other separators are possible, such as porous polyolefin based materials including polyethylene, polypropylene, and their blends; graft polymers including micro-porous poly(methyl methacrylate) and siloxane grafted polyethylene; poly(vinylidene fluoride) (PVDF) nanofiber webs; polytriphenylamine (PTPAn)-modified separator.

It is possible that impurities and dust from the air might diffuse inside and enter the electrolyte and clog the porous cathode in time. This problem can be addressed by using suitable air filters placed at the air intakes. Other filters can be used at various points in the system to ensure a high purity of the water and/or other electrolyte liquids.

Catalysts can be used to increase the cathode potential during the discharge and decrease it during the charging process, as discussed in the last section. The round-trip energy efficiency can be improved significantly by introducing bi-functional catalysts to increase/decrease the cathode potential during discharge/recharge. It was found that nano-size $\alpha$-$MnO_2$/carbon could lower the cathode potential by more than 0.3 V, while reducing $Li_2O_2$ to $2Li^+ + O_2$ during the discharge in the organic electrolyte. The cathode electrode can comprises mixture of porous carbons and catalysts. The catalysts can comprises at least one selected from the group consisting of platinum, gold, silver, $MnO_2$, $Ag_2Mn_8O_{16}$, $CeO_2$, $Y_2O_2SO_4$, $Gd_2O_2SO_4$, $La_2O_2SO_4$, and mixtures thereof.

The new metal-air flow battery provides a comprehensive solution to solve problems of traditional Li-air batteries such as low power (current) density and poor cyclability. The invention is not limited by cathode thickness because electrolyte flows through it carrying oxygen. Traditional cathodes are limited by $O_2$ diffusion. Diffusion is very slow in a liquid, and much faster when there is electrolyte flow. Prior efforts to flow electrolyte cause electrolyte to seep out of cathode into air. The invention avoids this problem by removing air and regenerating in the oxygen exchange unit. The invention allows for cathode thicknesses of at least 0.1 mm, 1 mm, 10 mm, 100 mm, or 500 mm to greater than 1 cm and thicknesses within these ranges. Prior art cathodes for Li-air batteries are practically limited to about 50-60 microns to allow $O_2$ diffusion. The cyclability is significantly improved by using a design with no solid product deposition at the cathode.

The initial aqueous electrolyte can be a diluted base (such as LiOH) or acid ($CH_3COOH$) solutions. For instance, in a base solution, the overall reaction described by eqn. (1) and the overall mass balance can be expressed as:

$$Li + 0.5O_2 + .5H_2O + 10.64H_2O \leftrightarrow Li^+ + OH^- + 10.64H_2O \qquad (6)$$

The discharge $Li^+ + OH^-$ product is formed at the surface of the cathode through a charge exchange process and is then dissolved in water. The maximum concentration of $Li^+$ and $OH^-$ ions is determined by the solubility of the LiOH in water which is 12.5 g of LiOH/100 g of water. The energy density of the Li-air flow battery can be estimated considering that the solubility of LiOH in $H_2O$ is 12.5 g of LiOH/100 g of $H_2O$ at 25° C.; since 1 mol LiOH needs at least 10.64 mol of $H_2O$ the specific capacity is:

$$c_p = \frac{F}{M_{Li} + 0.5 M_{H2O} + 10.64 M_{H2O}} \qquad (7)$$

$$= \frac{96485 \text{ C/mol}}{6.94 \text{ g/mol} + 11.14 \times 18 \text{ g/mol}}$$

$$= 465 \text{ C/g}$$

where $M_{Li}$=6.94 g/mol and $M_{H2O}$=18 g/mol. Since the operational voltage is $V_p$=3.69 V the estimated specific energy based on active materials is $E = c_p V_p$=477 Wh/kg. In the case of Li-air flow battery with an electrolyte made of diluted $CH_3COOH$ solution, the theoretical specific energy is 483 Wh/kg. Including the mass of the carbon, current collector, package materials, and small pumps, the estimated practical specific energy of Li-air flow battery is 40%× E≈200 Wh/kg.

When lithium metal is used as the anode electrode, the theoretical specific energy as high as 483 Wh/kg can be achieved for the Li-air flow battery; however, other materials can also be used as anode. The graphical carbon can be used as anode material and the electrochemical reaction at the anode during charge and discharge will be:

$$C_6Li \leftrightarrow C_6 + e^- + Li^+ \quad (8)$$

The theoretical specific capacity of Li-air flow batteries is:

$$c_p = \frac{F}{M_{C6} + 0.5M_{H2O} + 10.64M_{H2O}} \quad (9)$$

$$= \frac{96485 \text{ C/mol}}{72 \text{ g/mol} + 11.14 \times 18 \text{ g/mol}}$$

$$= 354 \text{ C/g}$$

where, $M_{C6}$=72 g/mol is the molecular weight of $C_6$. If it is assumed that the operational voltage is $V_p$=3.69 V, then the theoretical specific energy based on active materials is $E = c_p V_p$ = 363 Wh/kg.

Silicon is another high specific capacity material which can be used as anode. A specific capacity greater than 2000 mA/g has been achieved at a reasonable good cyclability. The specific capacity of 2000 mA/g corresponds to the fact that each silicon atom can intercalate (or react) with 2 lithium ions; therefore, the theoretical specific capacity of Li-air flow batteries is:

$$c_p = \frac{F}{\frac{1}{2}M_{Si} + 0.5M_{H2O} + 10.64M_{H2O}} \quad (10)$$

$$= \frac{96485 \text{ C/mol}}{\frac{1}{2} \times 28 \text{ g/mol} + 11.14 \times 18 \text{ g/mol}}$$

$$= 450 \text{ C/g}$$

Figure 4:
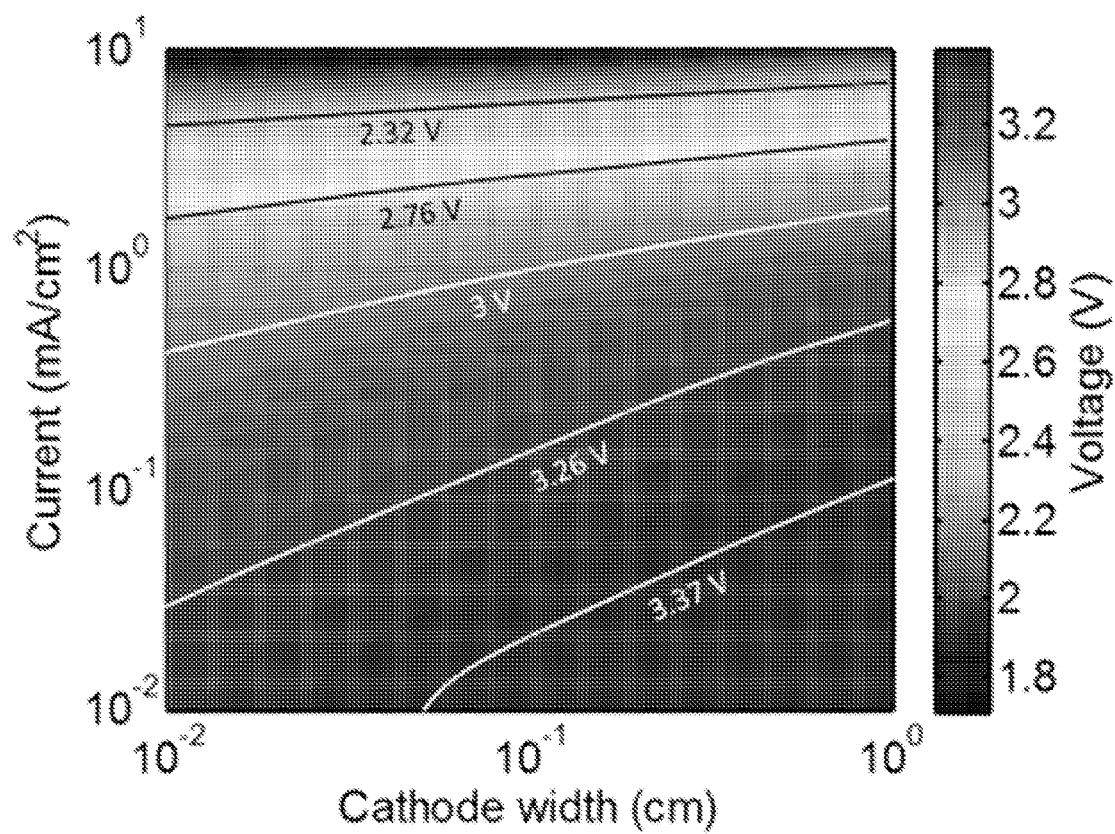
FIG. 4 is a plot of cell voltage as a function of the thickness of the air-electrode and current density.

The current density of new metal-air batteries was also estimated using finite element simulations to solve the transport equations in the electrochemical reaction unit. FIG. 4 shows the cell voltage as functions of current density (J) and the thickness of the air electrode. It was found that for an air electrode with a thickness of 1 cm, the cell voltages are 3.31, 3.22, and 2.64 V at current densities of 0.5, 1.0, and 5.0 mA/cm², respectively, when the electrolyte is saturated in air at 1 atm. These current densities are 10-100 times larger than those achieved by traditional Li-air batteries. An advantage of this metal-air flow battery is that the cathode can be as thick as 1 cm and filled with electrolyte saturated with oxygen. The amount of oxygen available in traditional Li-air batteries is mainly limited by the effective oxygen diffusion length $\lambda = 2F \in^{1.5} c_{O2} D_{O2}/J$, where $\in$ and $c_{O2}$ are the porosity and oxygen concentration in the air electrode, and $D_{O2}$ is the oxygen diffusion coefficient in the electrolyte. The effective thicknesses of the air electrode are only 13.6, 6.8, and 1.36 μm for J=0.5, 1.0, and 5.0 mA/cm², respectively, for 1 atm. air.

Figure 5:
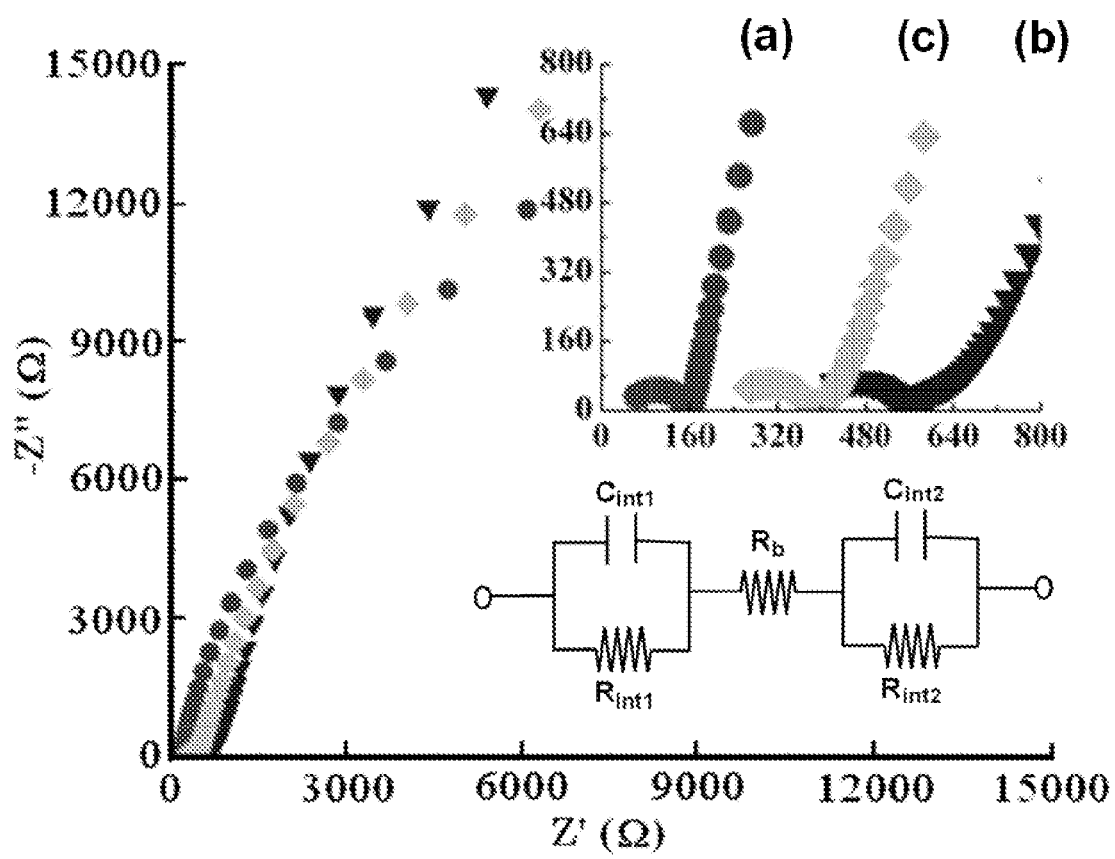
FIG. 5 is a plot of electrical impedance spectroscopy (EIS) measured from (a) 1 M LiOH solution in both electrolyte cells, (b) 1M $LiPF_6$ in PC in both electrolyte cells, and (c) 1 M LiOH solution and 1M $LiPF_6$ in PC in each electrolyte cell.

An important factor which limits the current density of the metal-air batteries is the voltage loss due to the ohmic resistance of the membrane. The membrane must not only have a good conductivity for Li ions but also good chemical stability in both non-aqueous and aqueous solutions, as well as be able to isolate the two electrolytes. The resistance of the membrane of such as Li-ion conducting glass-ceramic (LIC-GC) and of the interface between LIC-GC and the electrolytes were measured using the electrochemical impedance spectral (EIS) method. The LIC-GC from Ohara Inc. is a 50 μm thick membrane with a size of 2.54×2.54 cm² and was placed and sealed between two electrolyte cells. Each electrolyte cell has an open window of 1×1 cm². A Pt electrode was placed in each electrolyte cell. Two different electrolytes were used –1 M LiOH in $H_2O$ and 1M $LiPF_6$ in propylene carbonate (PC), respectively. The EIS was measured between two Pt electrodes at a frequency range of 1 Hz to 100 kHz using a Solartron 1250B frequency response analyzer controlled by Zplot and Corrware software. FIG. 5 is the EIS measured from (a) 1M LiOH solution in both electrolyte cells, (b) 1M LiPF6 in PC in both electrolyte cells, and (c) 1 M LiOH solution and 1M LiPf6 in PC in each electrolyte cell. FIG. 5 shows the EIS measured with different electrolytes in two electrolyte cells. The bulk resistance of the LIC-GC membrane and interfacial resistance between the membrane and electrolyte were obtained by fitting EIS using an equivalent electric circuit as shown in FIG. 5 (inset). $R_b$ represents the total bulk resistances from LIC-GC membrane and electrolytes. The two R and C pairs represent interfacial resistances at the two membrane interfaces. The resistance contributed by electrolytes was measured by removing the LIC-GC membrane when the same electrolyte was filled in both electrolyte cells and subtracted from the EIS as shown in FIG. 5. The resistance distribution can be summarized as follows: The bulk resistance of the LIC-GC membrane was $R_b$~50 Ω-cm² which is equivalent to a conductivity of 1×10⁻⁴ S/cm; the interfacial resistances were $R_{int1}$~70 Ω-cm² with the aqueous electrolyte (1 M LiOH solution) and $R_{int2}$~80 Ω-cm² with the non-aqueous electrolyte (1M $LiPF_6$ in PC), respectively; therefore, the total cell resistance at low frequencies was about 200 Ω-cm².

A battery according to the invention consists of a lithium-ion conducting glass-ceramic membrane sandwiched by a Li-metal anode in organic electrolyte and a carbon nano-foam cathode through which oxygen-saturated aqueous electrolyte flows. It features a flow cell design in which aqueous electrolyte is bubbled with compressed air, and is continuously circulated between the cell and a storage reservoir to supply sufficient oxygen for high power output. It shows high rate capability (5 mA cm⁻²) and renders a power density of 7.64 mW cm⁻² at a constant discharge current density of 4 mA cm⁻².

The maximum output power of the system is given by the maximum current density and the electrode size of the electrochemical reaction unit; the electrolyte storage unit determines the maximum energy storage and delivery capacity; and the oxygen exchange unit regenerates the electrolyte to become electrochemically reactive. The theoretical energy densities of these rechargeable Li-air flow batteries vary from 140 to over 1100 Wh/kg depending on the type of electrolytes in cathode. One of the advantages of Li-air flow batteries is that the energy and power capabilities can be totally separated according to the load requirements.

Example

An experimental Li-air flow battery was prepared. The cathode electrode does not open directly to the atmosphere to receive the oxygen; instead it circulates the electrolyte continuously between the electrochemical reaction unit and electrolyte storage unit (FIG. 3). For example, during discharge, the fresh electrolyte which is saturated with oxygen is pumped into the electrochemical reaction unit, while the used electrolyte will be sent to the oxygen exchange unit to be refreshed. In the Li-air flow battery, the anode is a piece a Li-metal foil (Alfa Aesar, 99.9%, 0.75 mm thickness). A piece of separator (Celgard 2400, Celgard LLC, Charlotte N.C.) was placed between a Li-metal foil and a lithium-ion conducting glass-ceramic (LIC-GC) membrane (Ohara Inc., 0.15 mm thickness). The cathode is a carbon nanofoam. The aqueous electrolyte at the cathode and electrolyte container was made with 0.85 M $CH_3COOH$ (HOAc, Sigma Aldrich, ≥99.7%) and $CH_3COOLi$ (LiOAc, Sigma Aldrich) in deionized water. The organic electrolyte at the anode was 1.2 M $LiPF_6$ in ethylene carbonate (EC)/dimethyl carbonate (DMC) at a ratio of 1:1 by weight as received (Novolyte Technologies Inc.).

Li-metal foil was roll-pressed onto the copper mesh, which acts as the anode. The LIC-GC was sealed on to an aluminum laminated polymer, leaving a window area of 3.61 $cm^2$ of LIC-GC open for lithium ion movement during discharge and charge processes. The aluminum laminated polymer that was used is a very flexible material accommodating for any volume changes in Li-metal anode. A glass sheet is used in conjunction with a stainless steel spring to put uniform and continuous pressure on the layered battery structure.

A piece of carbon nanofoam was used as the cathode electrode and was made as follows: The resorcinol (>99%) and sodium carbonate were dissolved in DI water, with stirring for fifteen minutes. The polymerization was initiated by introducing formaldehyde solution (37 wt. %) into the stirred solution to form the precursor solution. The ratio of resorcinol and formaldehyde is 1:2. In the precursor solution, a small amount of sodium carbonate catalyst was added. The precursor solution was filled into a stack of carbon fiber papers (from Lydall, density 0.2 $g/cm^3$, 90 um thick) which was placed between two glasses. A rubber O-ring was used to control the thickness of the carbon fiber paper and also acted as a sealant. After the filling process, the materials inside glass plate container were solidified by remained at room temperature for 2 days, then 80° C. for 2 days. The samples were dried at 50° C. under ambient pressure after an exchange of the pore liquid for acetone, then pyrolyzed under a nitrogen atmosphere at 1000° C. in a tube furnace. The furnace was purged with nitrogen at room temperature for one hour, and then ramped to 1000° C. at 5° C./min. The temperature remained at 1000° C. for two hours before returning to room temperature.

The electrolyte storage unit was a stainless steel container about 1 L in volume. Compressed air was bubbled into the aqueous electrolyte by a gas bubbler (McMaster-Carr). Dissolved oxygen (DO) and pH in aqueous electrolyte were measured to be 8.3 mg $L^{-1}$ and 4.5 by an Oakton Handheld Meter (PCD 650) and a Mettler-Toledo pH Meter, respectively. The aqueous electrolyte was circulated by a VWR variable flow mini-pump (Model 3389) at the speed of 250 mL $min^{-1}$. Charge and discharge measurements were carried out in air atmosphere at room temperature using an Arbin Instruments (Arbin-010 MITS pro 4.0-BT2000) controlled by a computer. The electrochemical impedance spectrum of the Li-air flow battery was recorded over a frequency sweep of 0.1-$10^6$ Hz using a Gamry Instruments (Reference 3000). The resulting spectrum was analyzed by Gamry Echem Analyst program.

Figure 6:
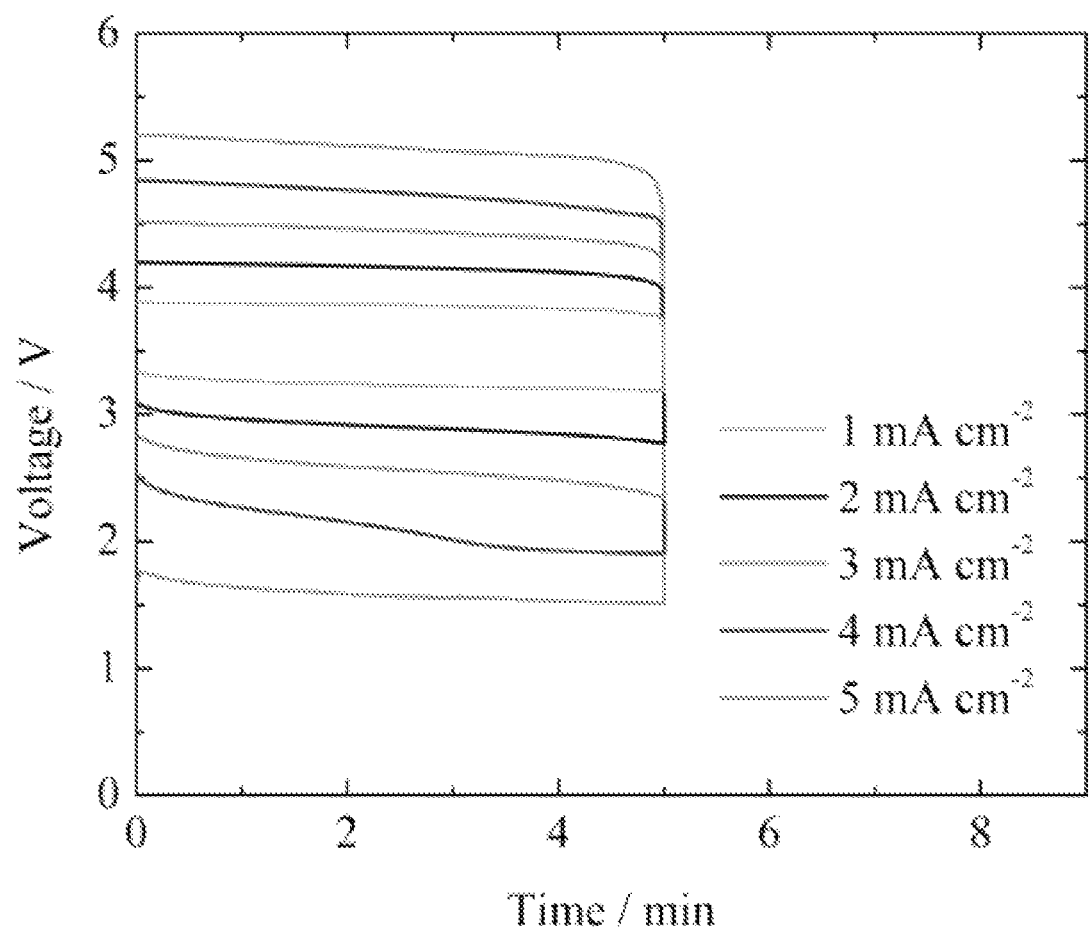
FIG. 6 is a plot of Li-air flow battery charge-discharge curves at various current densities.
Figure 7:
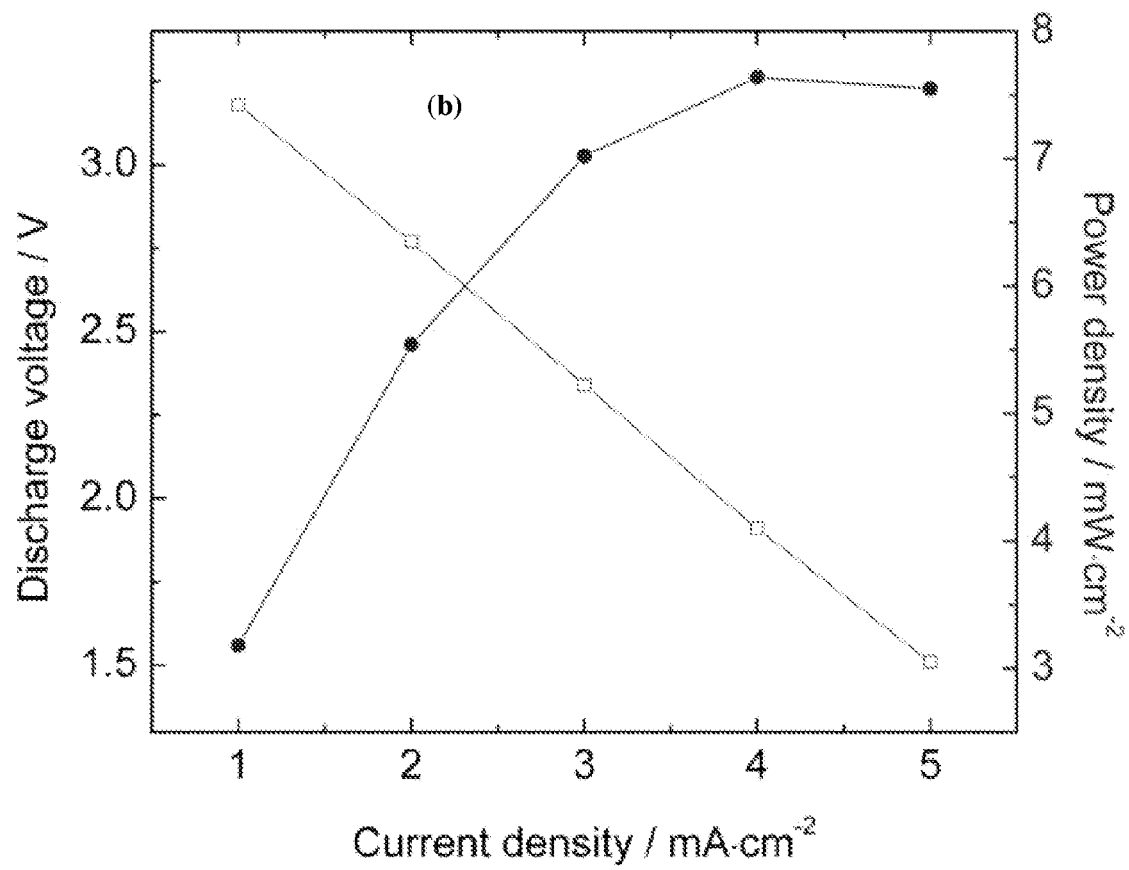
FIG. 7 is a plot of power performance.
Figure 8:
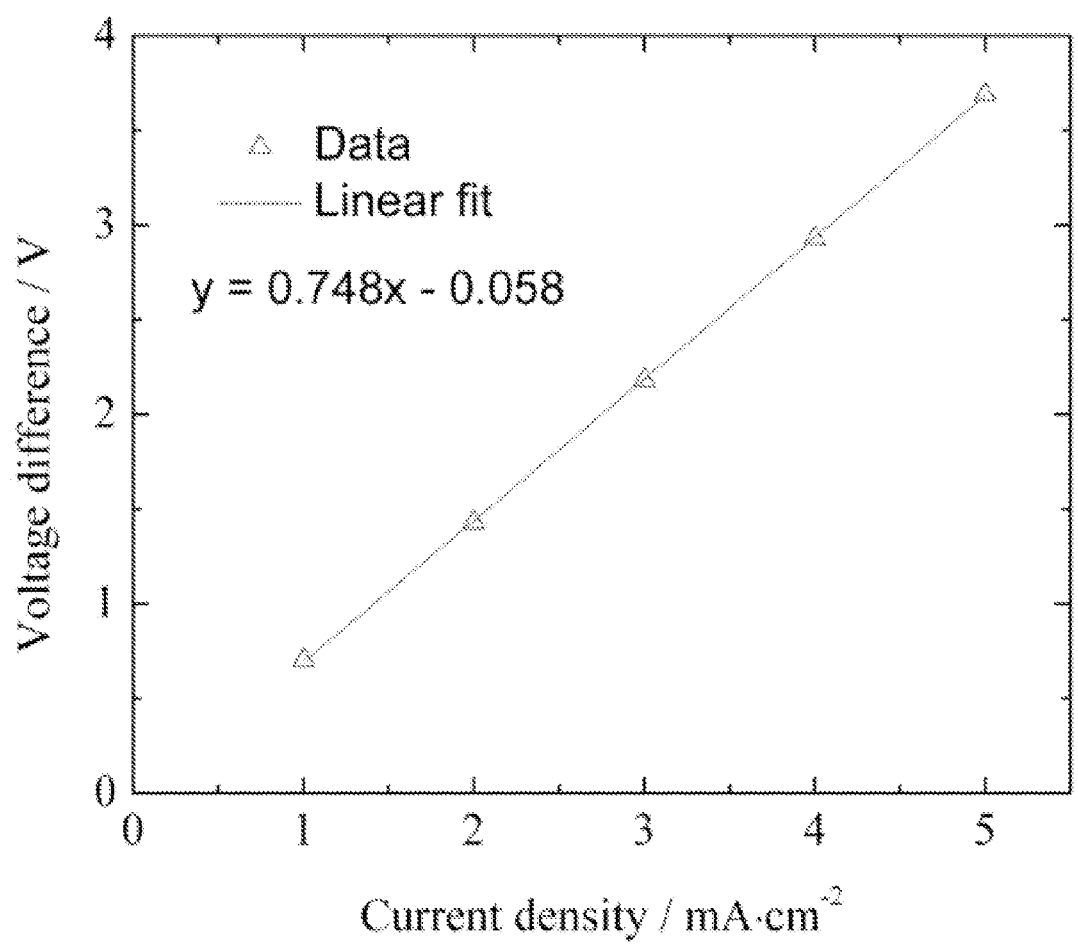
FIG. 8 is a plot of charge and discharge voltage difference at various current densities.

FIG. 6 displays the charge-discharge curves at various current densities. The discharge and charge voltages keep at 3.2 V and 3.9 V, respectively, at a current density of 1 mA $cm^{-2}$. Even at the current density of 5 mA $cm^{-2}$, the discharge and charge voltages still keep at 1.5 V and 5.2 V, respectively. With the growth of applied current density, the discharge voltage linearly decreases, while its power density sharply increases as shown in FIG. 7. At the current density of 4 mA $cm^{-2}$, the Li-air flow battery reaches its maximal power density of 7.64 mW $cm^{-2}$. As the applied current density grows, the linear increase of charge and discharge voltage difference is clearly observed in FIG. 8. The resistance of the Li-air flow battery calculated from the linear fit equation is about 374 $\Omega cm^2$. A current density of 5 mA is not common and is only limited by membrane resistance. The invention will permit higher current densities—the current density could go higher given that ohmic resistance is limiting factor.

Figure 9:
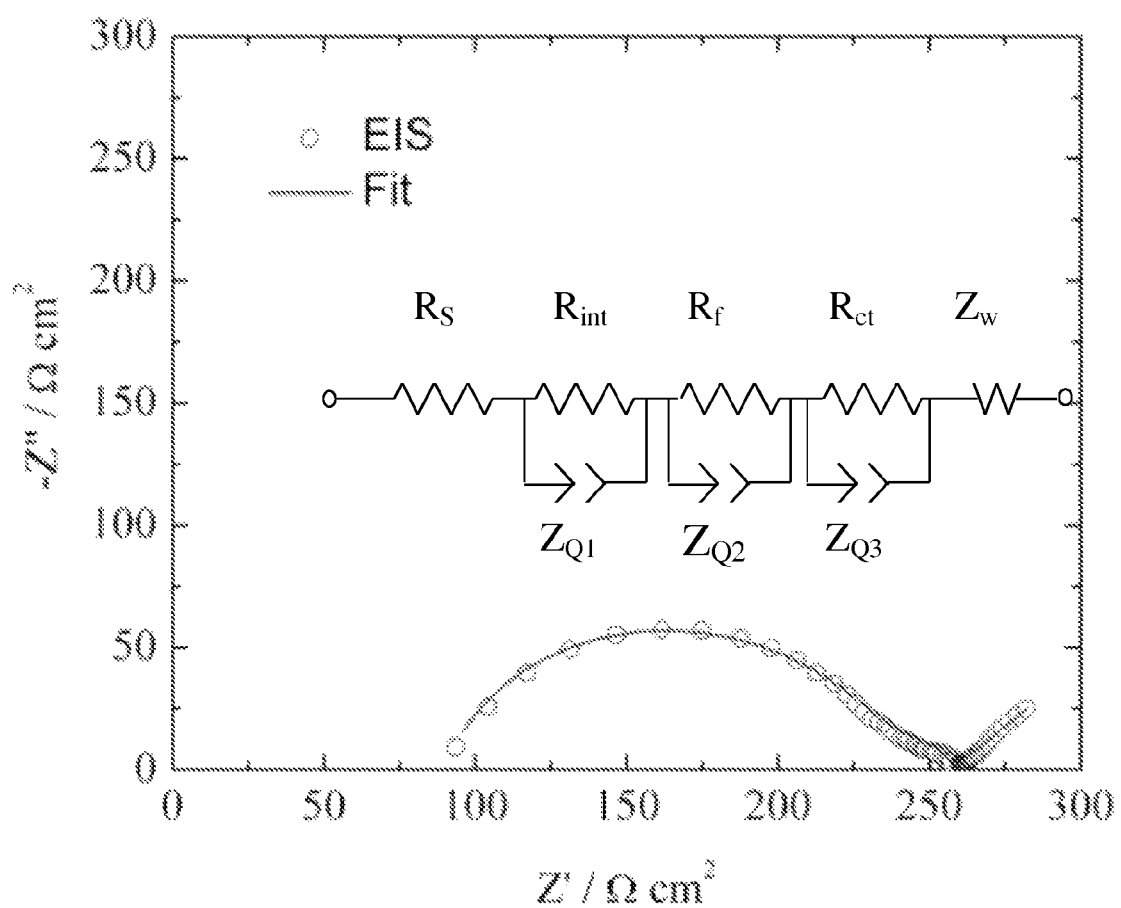
FIG. 9 is a plot of electrochemical impedance spectra after charge and discharge at 5 mA $cm^{-2}$. The inset is the equivalent electric circuit used to fit EIS.

The electrochemical impedance spectra (EIS) of a Li-air flow battery is recorded after charge and discharge at 5 mA $cm^{-2}$ at a frequency range of 0.1-$10^6$ Hz in FIG. 9. An equivalent electric circuit is used to simulate the EIS, as shown in the inset of FIG. 9. The total resistance of cell membrane is 200 of the 250 so this resistance is clearly the limiting factor to current density performance. In the circuit, the high frequency intercept of the semicircle on the real axis is reflected by an ohmic resistance ($R_s$), which is predominantly the bulk resistance of the LIC-GC. The large semicircle in the high frequency range represents the interfacial resistance ($R_{int}$) of the LIC-GC with both organic electrolyte and aqueous electrolyte. The small semicircle in the middle frequency range corresponds to (i) the resistance of a passivation film ($R_f$) on the lithium electrode surface, and (ii) the charge-transfer resistance ($R_{ct}$). Three constant phase elements ($Z_Q$) are in parallel with the resistance. An inclined line in the low frequency range is related to a finite length Warburg element ($Z_w$) arising from a diffusion-controlled process. The $O_2$ diffusion resistance is negligible due to the high speed circulation of $O_2$-saturated aqueous electrolyte. The fitting parameters are listed in Table 1. It can be seen that the total resistance is comparable to the value calculated from the linear fit equation in FIG. 8. From the fitted results, the ohmic resistance ($R_s$) is approximately 90 $\Omega cm^2$, and the interfacial resistance ($R_{int}$) is around 115 $\Omega cm^2$. These values are consistent with previous measurements of the ionic resistance and the interface resistances from the LIC-GC. These two resistances which take up a major part in the total resistance are mainly attributed to the LIC-GC. Accordingly, higher power performance could be achieved by reductions in the resistance of the Li-ion conducting glass ceramic.

In some Li-air flow batteries, Li-metal foil is used as the anode electrode. The safety of the Li metal is always an important consideration. Table 2 shows theoretical energy densities of Li-air flow batteries if different anode materials such as Li metal, silicon, and graphite carbon are used. The theoretical specific energy was calculated based on EC reaction as:

$$4Li + O_2 + 4CH_3COOH \leftrightarrow 4CH_3COOLi + 2H_2O \quad (1)$$

Since the solubility of the discharge product $CH_3COOLi$ is 45 g $CH_3COOLi$ per 100 g $H_2O$; therefore the maximum specific capacity can be calculated by:

$$c_p = \frac{F}{M_{anode} + M_{C_2H_4O_2} + 7.65 M_{H_2O}} \quad (2)$$

where, F is the Faraday constant. $M_{anode}$ is the molecular weight of the anode material are 6.94 g/mol, 13.3 g/mol, 79 g/mol for Li metal, silicon, and graphite carbon, respectively. $M_{C2H4O2}$ and $M_{H2O}$ are the molecular weight of $CH_3COOH$ and water, respectively. The theoretical specific energy was calculated as:

$$\varepsilon = c_p \times V \quad (3)$$

A cell voltage of 3.6 V was used.

TABLE 1

| $R_s$ (Ω cm²) | $R_{int}$ (Ω cm²) | $Z_{Q1}$ | | $R_f$ (Ω cm²) | $Z_{Q2}$ | | $R_{ct}$ (Ω cm²) | $Z_{Q3}$ | | $Z_w$ | |
|---|---|---|---|---|---|---|---|---|---|---|---|
| | | $Q_0(\Omega^{-1}s^\alpha)$ | α | | $Q_0(\Omega^{-1}s^\alpha)$ | α | | $Q_0(\Omega^{-1}s^\alpha)$ | α | $R_w$ (Ω cm²) | $T_w$ (S) |
| 89.9 | 115.3 | $2.7 \times 10^{-7}$ | 0.96 | 34.1 | $1.1 \times 10^{-6}$ | 0.79 | 19.2 | $1.1 \times 10^{-4}$ | 0.81 | 144.4 | 27.1 |

Fitting parameters of EIS curve fitting

TABLE 2

The theoretical specific energy of Li-air flow batteries with different anode electrode materials

| Anode Material | Anode Specific Capacity (mAh/g) | Theoretical Cell Specific Energy (Wh/kg) |
|---|---|---|
| Li | 3862 | 477 |
| SiLi$_{4.4}$ | 371 (C) | 463 |
| C$_6$Li | 4200 (Si) | 354 |

Figure 10:
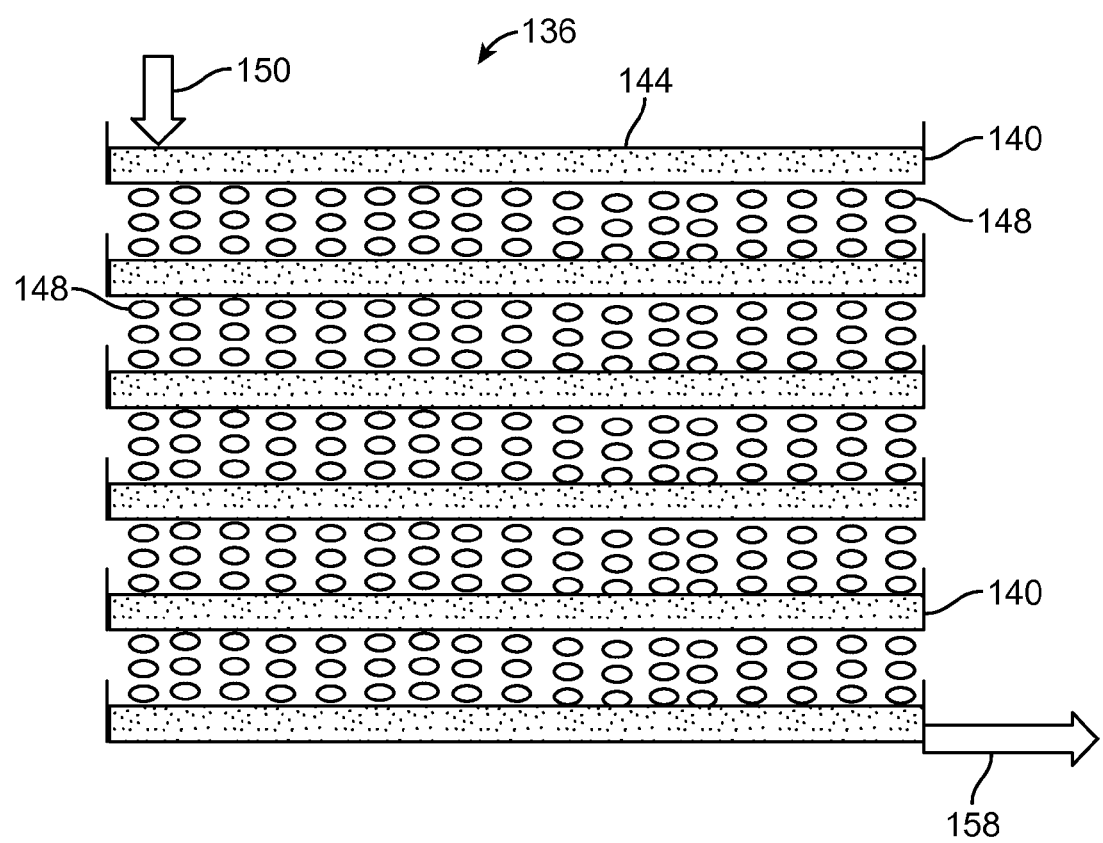
FIG. 10 is a schematic diagram of an alternative design of an oxygen exchange unit.
Figure 11:
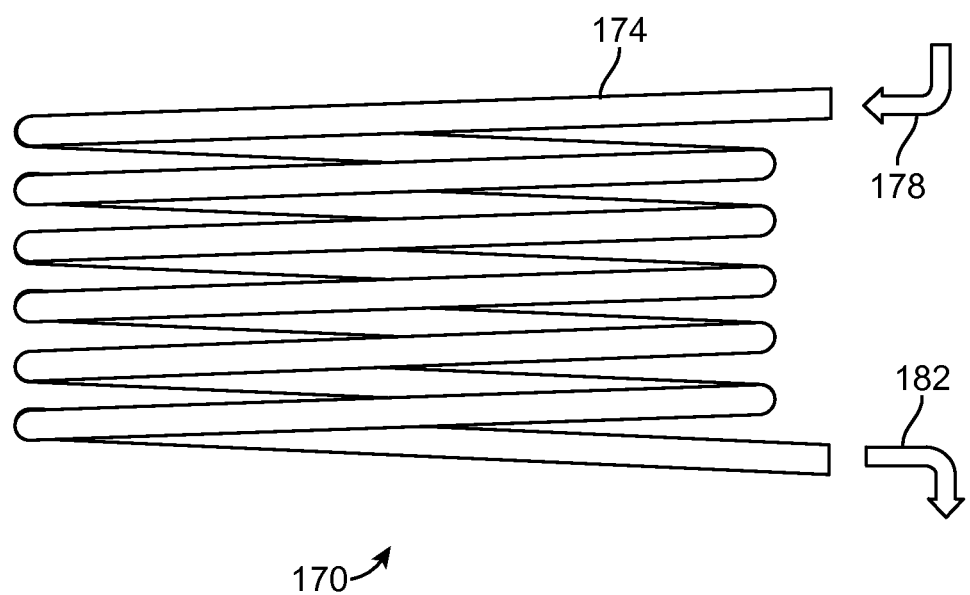
FIG. 11 is a schematic diagram of another alternative design of an oxygen exchange unit.

The oxygen exchange unit can be of any suitable design. FIG. 10 shows another possible design for the oxygen exchange unit 136 in which a series of trays 140 can contain cathode electrolyte 144 and allows the electrolyte to fall as drops 148 such that the drops are contacted with oxygen. An inlet 150 and outlet 158 are provided. FIG. 11 shows an alternative oxygen exchange unit 170. The cathode electrolyte from the electrochemical reaction unit can be fed into an oxygen exchange unit made of a tube 174 with various shapes such as the coil shown in FIG. 11. The cathode electrolyte will flow into the tube 174 from a higher inlet 178 to a lower outlet 182, or can be pumped under pressure. The tube 174 can be made with some open holes at the upper surface to allow air diffusion into the tube and the cathode electrolyte flowing therein. The tube 174 can also be made with materials which have the property that oxygen can permeate through the tube wall, however, the liquid electrolyte cannot permeate out from through the tube wall. Other designs are possible.

The metal-air flow battery of the invention will have a significant impact on the grid-scale energy storage because: (1) the cost of metal-air flow batteries will be significantly lower compared to other batteries; (2) the energy density of the proposed metal-air flow batteries is above 200 Wh/kg, which is much higher than that of existing flow, liquid-metal, lead-acid, or advanced Li-ion batteries; (3) the metal-air flow batteries of the invention are different from conventional batteries in which the maximum energy storage and power deliverable are proportional to the weight of the battery, and the energy and power capabilities can be totally separated according to the load requirements. In metal-air flow batteries, the total energy storage is determined by the volume of the electrolyte storage unit and the maximum power capability is determined by the size and design of the electrochemical reactor unit; (4) the manufacture shipment and installation weight of metal-air flow batteries is low, because only the reactor, which accounts for <20% of the total weight of the battery, needs to be pre-installed. The major weight of the battery is water, which can be introduced in the battery on the site, after the installation.

This invention can be embodied in other forms without departing from the spirit or essential attributes thereof, and reference should therefore be had to the following claims as indicating the scope of the invention.

We claim:

1. A metal air flow battery, comprising:
an electrochemical reaction unit, comprising:
an anode electrode comprising Li;
a cathode electrode comprising porous carbon and catalyst;
an ionic conductive membrane between the anode and the cathode;
an organic anode electrolyte;
an aqueous cathode electrolyte;
the ionic conductive membrane isolating the organic anode electrolyte from the aqueous cathode electrolyte, and being chemically stable with the organic anode electrolyte and the aqueous cathode electrolyte;
a cathode electrolyte inlet and a cathode electrolyte outlet for supplying and removing only the aqueous cathode electrolyte to and from the electrochemical reaction unit, and not the anode electrolyte;
an oxygen exchange unit in fluid communication with the cathode electrolyte inlet and the cathode electrolyte outlet for contacting the cathode electrolyte with oxygen separate from the electrochemical reaction unit; and,
at least one pump for pumping cathode electrolyte between the electrochemical reaction unit and the oxygen exchange unit.

2. The metal air flow battery of claim 1, further comprising an electrolyte storage unit for receiving cathode electrolyte from the electrochemical reaction unit and returning cathode electrolyte to the electrochemical reaction unit.

3. The metal air flow battery of claim 1, wherein the porous carbon comprises at least one selected from the group consisting of carbon black, activated carbon, carbon nanotubes, carbon nanofibers, carbon fibers, and mixtures thereof.

4. The metal air flow battery of claim 1, wherein the catalyst comprises at least one selected from the group consisting of platinum, gold, silver, $MnO_2$, $Ag_2Mn_8O_{16}$, $CeO_2$, $Y_2O_2SO_4$, $Gd_2O_2SO_4$, $La_2O_2SO_4$, and mixtures thereof.

5. The metal air flow battery of claim 1 wherein the anode is lithium metal.

6. The metal air flow battery of claim 1, wherein the anode comprises at least one selected from the group consisting of silicon, germanium, titanium, graphite carbon, and hard carbon.

7. The metal air flow battery of claim 1, wherein the cathode electrolyte comprises at least one selected from the group consisting of LiOH, $CH_3COOLi$, $LiClO_3$, $LiClO_4$, HCOOLi, $LiNO_3$, $C_6H_4(OH)COOLi$, $Li_2SO_4$, LiBr, LiCl, LiSCN, and mixtures thereof.

8. The metal air flow battery of claim 1, wherein the anode electrolyte comprises a solvent selected from the group consisting of ethylene carbonate, propylene carbonate, dimethyl carbonate, diethyl carbonate, tetrahydrofuran, dimethoxyethane, and mixtures thereof.

9. The metal air flow battery of claim 1, wherein the anode electrolyte comprises a salt selected from the group consisting of lithium perchlorate, lithium hexafluoroarsenate, lithium tetrafluoroborate, and mixtures thereof.

10. The metal air flow battery of claim 1, wherein the ionic conductive membrane comprises at least one selected from the group consisting of Li-ion glass-ceramic, polyethylene, polypropylene, poly(methyl methacrylate), siloxane grafted polyethylene, poly(vinylidene fluoride), and polytriphenylamine.

11. The metal air flow battery of claim 1, wherein the oxygen exchange unit comprises an electrolyte storage unit.

12. The metal air flow battery of claim 1, wherein the oxygen exchange unit comprises a discharge manifold for discharging oxygen into cathode electrolyte.

13. The metal air flow battery of claim 1, wherein the oxygen exchange unit comprises a plurality of stacked trays having apertures for the upward flow of oxygen and the downward flow of cathode electrolyte.

14. The metal air flow battery of claim 1, wherein the oxygen exchange unit comprises an elongated conduit, the conduit comprising portions that are permeable to oxygen and impermeable to the cathode electrolyte.

15. The metal air flow battery of claim 1, wherein electrolyte entering the electrochemical reaction unit is caused to flow into one part of the porous cathode, flow through the porous cathode, and flow out of another side of the porous cathode.

16. The metal air flow battery of claim 1, wherein the porous carbon comprises carbon nanofoam.

* * * * *